July 23, 1963
R. H. CHAPLIN
3,098,628
AIRCRAFT
Filed Jan. 30, 1961
4 Sheets-Sheet 1
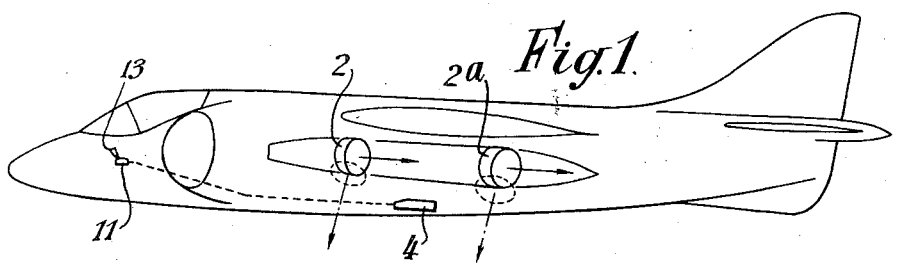
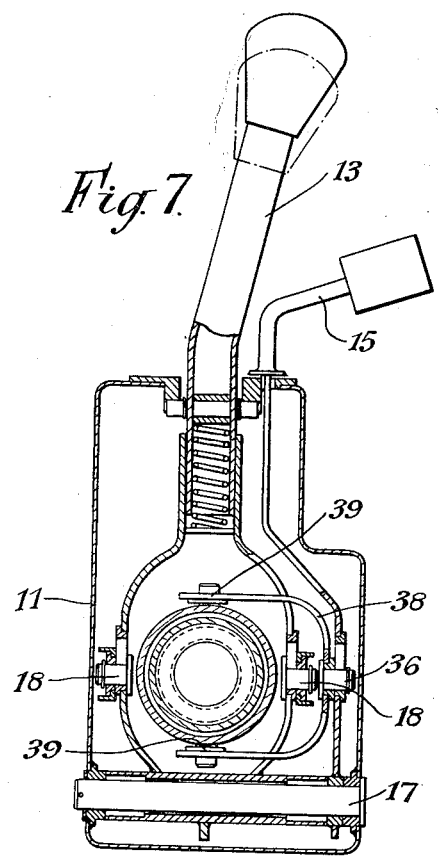
INVENTOR
Roland Henry Chaplin
BY
Stevens Davis Miller & Mosher
ATTORNEYS

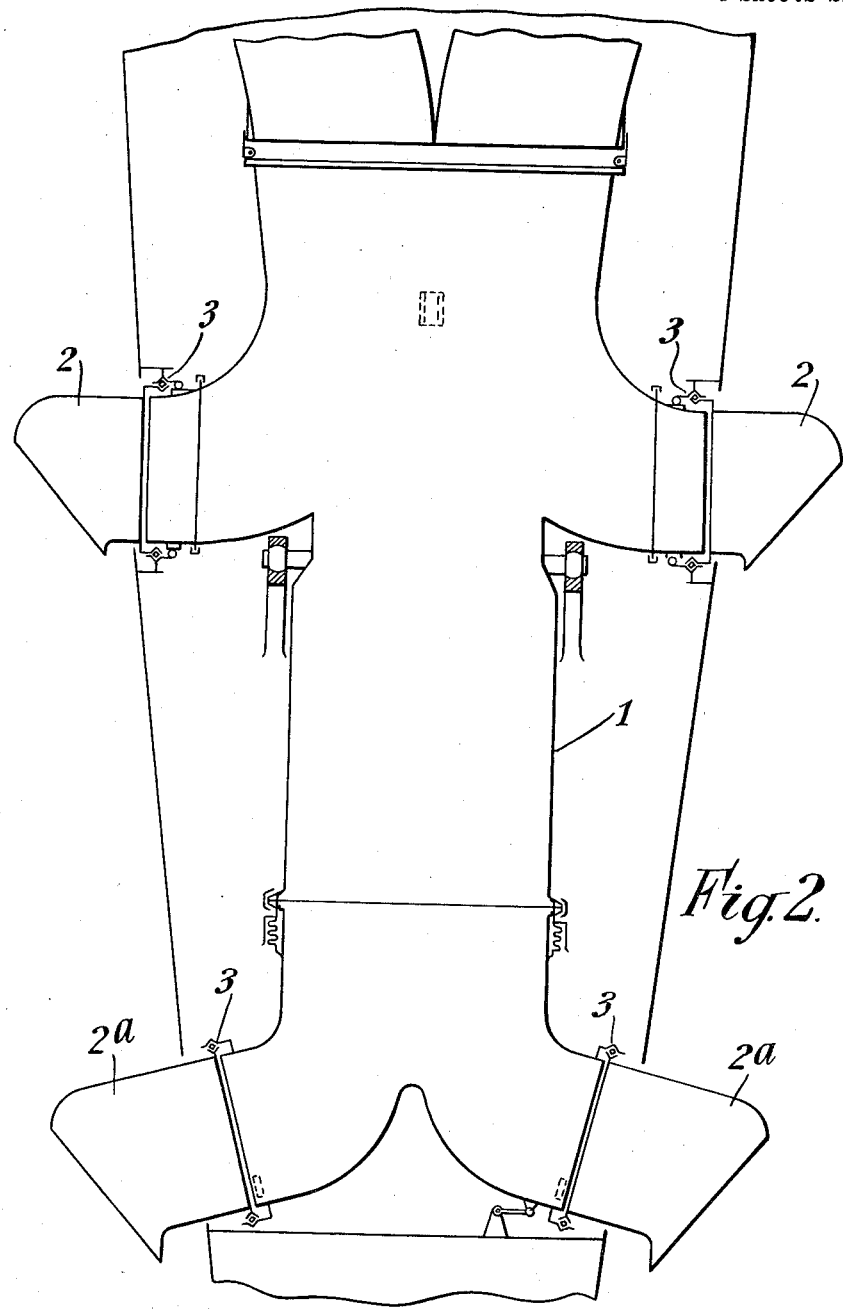

July 23, 1963  R. H. CHAPLIN  3,098,628
AIRCRAFT
Filed Jan. 30, 1961  4 Sheets-Sheet 3
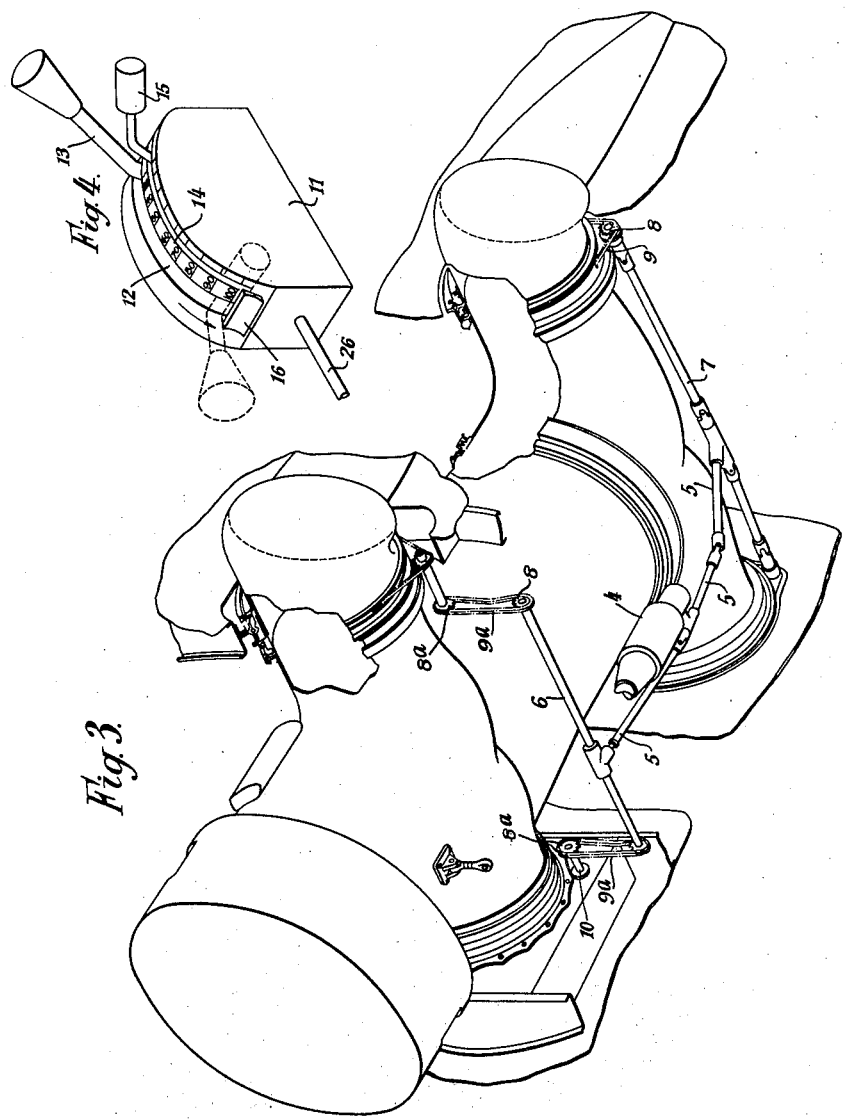
INVENTOR
Roland Henry Chaplin
BY
Stevens Davis Miller & Mosher
ATTORNEYS

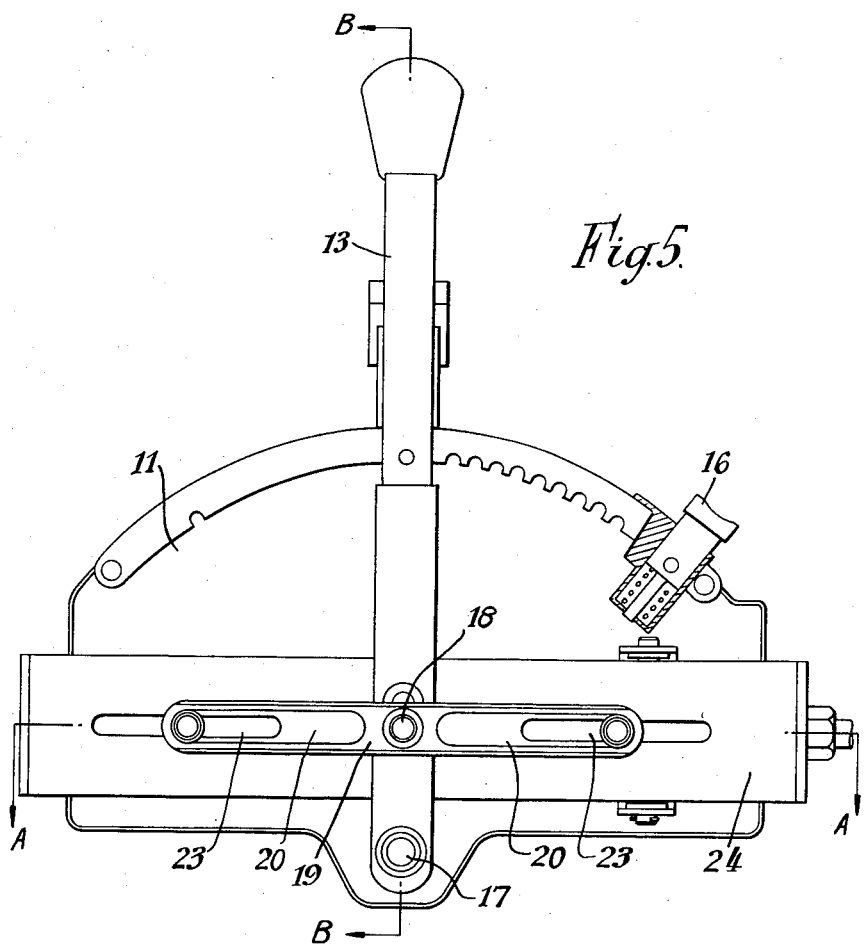

United States Patent Office 3,098,628
Patented July 23, 1963

3,098,628
AIRCRAFT
Roland Henry Chaplin, Weybridge, England, assignor to Hawker Aircraft Limited, Kingston-upon-Thames, England
Filed Jan. 30, 1961, Ser. No. 85,517
2 Claims. (Cl. 244—83)

This invention relates to aircraft of the vertical take-off and landing type, the phrase being intended to cover fixed wing aircraft which are either capable of taking off and landing vertically, or alternatively taking off and landing at a steep angle and at speed below stalling speed.

The invention is particularly concerned with the type of fixed wing aircraft forming the subject of copending patent application 843,302 which aircraft included a gas turbine mounted within the fuselage, the gas turbine having associated therewith a pair of nozzles situated forward of the centre of gravity and a second pair of nozzles situated aft of the centre of gravity, the nozzles comprising each pair projecting from the fuselage on opposite sides, the forward pair of nozzles discharging air bled from the compressor of the gas turbine, the aft pair of nozzles discharging efflux gases from the turbine, the nozzles being mounted for simultaneous orientation, whereby the whole volume of air and efflux gases discharged from the four nozzles could be directed rearwardly and used for forward propulsion or directed downwardly to produce vertical or otherwise upward lift.

Furthermore it is preferred that the nozzles shall be capable of movement beyond a vertical position in a forward direction, the angular movement of the nozzles being in the region of 100°, whereby the thrust from the nozzles can be directed in a downward and slightly forward direction during the transition stage between forward flight and hovering or downward flight preparatory to landing.

The present invention is concerned with the orientation of the nozzles during the transition stage between vertical take-off or take-off at an abnormally steep angle and forward flight and conversely between forward flight and hovering or downward flight, for example for landing purposes.

It will be appreciated that when taking off vertically or at a speed well below stalling speed the wings and tail surfaces of the aircraft will not to any material extent contribute to the lift and consequently the aircraft must necessarily pass through a transition stage between vertical or near vertical flight and normal forward flight where the thrust from the four nozzles will still be provided the greater part of the lift but the aircraft as a result of orientation of the nozzles is building up forward speed, during which period the wings and tail surfaces are gradually taking over the lift.

It is, of course, essential that the speed of orientation of the nozzles in that direction shall be carefully controlled, orientation being progressive but slow, but conversely during the transition stage between forward flight and hovering or vertical flight, for example flight in a downward vertical direction, orientation shall be rapid from the point of view of first slowing up the aircraft and then, after the speed has fallen to near stalling speed, taking over the lift, the downward thrust from the nozzles finally taking the whole weight of the aircraft.

The invention consists broadly in the provision of a control mechanism which when operated will automatically slow down the speed of orientation of the nozzles from a vertical or near vertical position to a horizontal position and conversely will produce a rapid orientation of the nozzles from the horizontal to a vertical or near vertical position.

The control preferably takes the form of a hydraulic damper, dash pot or the like which operates to slow down orientation in the one direction but is inoperative in the opposite direction.

It is preferred that orientation of the nozzles shall be instigated by the pilot and through the medium of a hand operated lever in the cock pit, the pilot operated mechanism taking the form of a control box.

Referring to the accompanying drawings:

FIGURE 1 is a fragmentary side elevation of an aircraft exemplifying the present invention;

FIGURE 2 is a plan view;

FIGURE 3 is a fragmentary perspective view diagrammatically illustrating one method of orientating the nozzles;

FIGURE 4 is a perspective view of the pilot's control mechanism for orientating the nozzles;

FIGURE 5 is a sectional side elevation of the control mechanism; and

FIGURES 6 and 7 are sectional views on the lines A—A and B—B in FIGURE 5.

The invention will now be described in detail in its application to an aircraft of the kind disclosed by the specification and drawings of co-pending patent application 843,302, the aircraft being fitted wtih a gas turbine, the casing of which is diagrammatically shown and indicated by reference numeral 1, the gas turbine being arranged at or about the centre of gravity of the aircraft and having a pair of nozzles 2 situated forward of the centre of gravity and a second pair of nozzles 2a situated aft of the centre of gravtiy, the forward pair of nozzles 2 discharging air delivered by a fan or compressor of the gas turbine, the aft pair of nozzles 2a discharging efflux gases from the turbine, the nozzles being mounted for simultaneous orientation through pipe couplings 3 which permit orientation of the nozzles through an angle through at least 90° although this movement may be increased to as much as 180° to provide the maximum amount of forward thrust for braking purposes. In the arrangement shown however, in FIGURE 1 the nozzles are arranged for simultaneous orientation through an angle of 100°.

To stabilize the aircraft during vertical take off and at other times when the control surfaces are ineffective downwardly directed control nozzles are provided at or near the nose and tail and at the wing tips, and air is bled to these nozzles from the compressor. Such control nozzles however form no part of the present invention, the present invention being concerned primarily with the controlled movement of nozzles 2 and 2a.

Any suitable means may be employed for connecting the two pairs of nozzles together so that they can be oriented simultaneously but as the nozzles are naturally widely spaced both lengthwise and widthwise of the aircraft it is preferred to employ some such means which will operate satisfactorily where there is a substantial expansion of the gas turbine casing both lengthwise and widthwise of the aircraft.

One suggested method of orientating the nozzles is shown in FIGURE 3 consisting of an air motor 4 driving an articulated shaft 5 having a geared connection with transverse shafts 6 and 7 fitted with sprocket wheels 8 which in the case of the rear nozzles are connected directly by means of chains 9 with the rear nozzles, chains 9a in the case of the forward pair of nozzles 2 being connected with additional sprockets 8a carried by shafts 10, carrying sprocket wheels 8b which in turn are connected with the front nozzles by chains 9.

Referring now to FIGURES 4 to 7 which illustrate a preferred form of pilot's control for orientating the nozzles in the desired direction, the control consists of a casing 11 having a main gate 12 for movement of the main control lever 13 and a subsidiary gate 14 for movement of a manual override and follow up lever 15.

The latter as its name implies follows up the movement of lever 13 in either direction and also provides a manual override for use in an emergency if for any reason the pilot wishes to increase the speed of orientation of the nozzles in the one direction over and above the speed determined by the dashpot or the like, the operation of which is about to be described.

The gate 12 contains a preselector stop 16 which can be set to limit movement of the lever 13 in one direction thereby limiting the angle of orientation of the nozzles in that direction.

The casing is calibrated as shown to give a visual indication of the angular position of the nozzles obtained as a result of a particular movement of the preselector stop 16.

A teleflex or other type of control 26 connects the levers 13 and 15 with the controls of the air motor 4.

It will be appreciated that the angular positioning of the nozzles will depend upon the particular flight path chosen by the pilot.

The pilot wishing to alter the position of the nozzles carries out the following operations:

(1) Move the preselector stop 16 to the required nozzle position. This can be done at the pilot's convenience.
(2) At the required instant that the nozzles are to be rotated the main control lever 13 is slammed back against the stop 16 and is automatically locked into position. The pilot can do this without looking. No matter how fast the lever is moved for the slow rate of rotation the damper takes charge to give the necessary rate.
(3) The follow up lever 15 gives a visual indication of the nozzle position and in an emergency allows the pilot to override or overcome any sticking in the damper or to increase the rate of rotation if necessary.

The markings on the casing adjacent the gates indicate the angular position of the nozzles relative to the horizontal, the nozzles when the lever 13 is in the full line position facing aft at zero degrees and when the lever is in the dotted line position occupying a position in which they are directed downwardly and forwardly at an angle of 100° to the horizontal. Movement of the lever 13 from the full to the dotted line position will produce a quick orientation of the nozzles as is necessary for the transition stage between forward and vertical flight, movement in the opposite direction of the lever providing a slow orientation of the nozzles during the transition stage between vertical and forward flight, the speed being increased if necessary by operation of the manual override lever 15.

Turning now to FIGURES 5 to 7 of the drawings which illustrates in detail the pilot's control illustrated by FIGURE 4, levers 13 and 15 are pivotally mounted about a common fulcrum point 17 in the casing 11. Lever 13 has a pin and slot connection 18 with a frame 19; the parallel side members of which are formed with longitudinally arranged slots 20.

The side members are connected at one end by a transverse pin 21 and engage shorter pins 22 at their opposite ends. Pins 21 and 22 pass through slots 20.

Pins 21 and 22 pass through slots 23 in the walls of a tubular inner casing 24 having a bearing 25 at one end for the inner component of the teleflex control 26.

The inner casing 24 at its opposite end carries a piston rod 27 having a piston 28 sliding in a cylinder 29 rigidly associated with a tubular member 30 slidably mounted in the inner casing 24 and formed with slots 31 in its walls for the passage of pins 21 and 22.

Cylinder 29 contains air or a hydraulic fluid and is provided with sealing glands 32 at its opposite ends through which the piston rod 27 passes.

Pin 21 passes through a plate 33 which engages one end of a helical compression spring 34, the opposite end of the latter engaging a second plate 35 carrying the pins 22 and bearing on a shoulder on the member 30. Plate 33 also engages a closure cap closing the opposite end of member 30.

Piston 28 is so constructed that there will be a free flow of fluid past the piston in the direction of the arrow but a restricted flow in the opposite direction to provide the required damping effect.

Lever 15 has a pivotal connection 36 with an arm 37 on a yoke 38 having inwardly directed pins 39 passing through longitudinal slots (not shown) in casing 24 and engaging member 30. In this way follow up lever 15 will follow up endwise movement of the member 30 under the control of the dash-pot device but can be moved manually to override the action of the dash pot and actuate the teleflux control directly if required.

Lever 13 is provided with the usual spring urged pin engagement with a series of notches in the gate, the lever being freed by pressing it in a downward direction. A similar arrangement is provided in the case of the pre-set knob 16.

During for example take-off and for the transition stage between vertical and forward flight, lever 15 will be moved to the left in FIGURE 5. This compresses spring 34 and starts a slow flow of fluid past the piston with a consequential slow axial movement of member 30 and teleflex control 26 which produces a slow orientation of the nozzles. If the lever is moved over to the right the fluid can pass the piston freely and consequently the nozzles will be orientated through the selected angle immediately.

I claim:
1. In an aircraft of the vertical take-off and landing type, wherein vertical lift and forward propulsion is obtained by efflux nozzles capable of orientation between vertical and horizontal positions, control mechanism for effecting such orientation, means operable as a result of movement of said control mechanism to move said nozzles from a vertical to a horizontal position to produce a slow speed of orientation, said means being inoperative when said control mechanism is operated to move said nozzles in the opposite direction to ensure rapid orientation of said nozzles from a horizontal position to a vertical position, a control lever movable in either direction according to the required direction of orientation, a dash-pot brought into operation by movement of the lever when the latter is moved to give a slow orientation, a gate in which the lever moves, the gate being calibrated to show different angles of orientation of the nozzles and a preselector stop in the gate which can be set to limit angular movement of the lever in the direction which will produce a quick orientation of the nozzles and an override and follow up lever which is operable if required to increase the speed of orientation or for use in an emergency in the event of the dash-pot not operating efficiently.

2. In an aircraft of the vertical take-off and landing type, wherein vertical lift and forward propulsion is obtained by efflux nozzles capable of orientation between vertical and horizontal positions, control mechanism for effecting such orientation, means operable as a result of movement of said control mechanism to move said nozzles from a vertical to a horizontal position to produce a slow speed of orientation, said means being inoperative when said control mechanism is operated to move said nozzles in the opposite direction to ensure rapid orientation of said nozzles from a horizontal position to a vertical position, a control lever movable in either direction according to the required direction of orientation, a dash-pot brought into operation by movement of the lever when the latter is moved to give a slow orientation and a flexible control member movable by the control lever and controlling the rotational direction of an air motor driving the nozzles through a system of driving chains and sprocket wheels.

References Cited in the file of this patent

UNITED STATES PATENTS

| | | |
|---|---|---|
| 2,061,170 | Post | Nov. 17, 1936 |
| 2,859,003 | Servanty | Nov. 4, 1958 |
| 2,961,189 | Doak | Nov. 22, 1960 |
| 2,974,900 | Morris et al. | Mar. 14, 1961 |
| 2,974,907 | Eggers et al. | Mar. 14, 1961 |

OTHER REFERENCES

Aeronautical Engineering Review, vol. 16, October 1957.

Problems of Stability and Control for VTOL Aircraft, pages 78-84.